(12) United States Patent
Inciardi et al.

(10) Patent No.: US 8,762,166 B2
(45) Date of Patent: Jun. 24, 2014

(54) CONDITION STATE MONITOR AND MEDICATION MANAGER

(75) Inventors: Salvatore Richard Inciardi, Manalapan, NJ (US); Sandra D. Elliott, Barnegat, NJ (US)

(73) Assignee: iMPak Health, LLC, Neptune, NJ (US)

( * ) Notice: Subject to any disclaimer, the term of this patent is extended or adjusted under 35 U.S.C. 154(b) by 73 days.

(21) Appl. No.: 13/029,756

(22) Filed: Feb. 17, 2011

(65) Prior Publication Data

US 2011/0288380 A1 Nov. 24, 2011

Related U.S. Application Data

(60) Provisional application No. 61/305,433, filed on Feb. 17, 2010.

(51) Int. Cl.
  *G06Q 10/00* (2012.01)
  *G06Q 50/00* (2012.01)
  *G06F 17/00* (2006.01)

(52) U.S. Cl.
  USPC ............... 705/2; 705/3; 700/241; 700/242

(58) Field of Classification Search
  USPC ............ 705/2–3; 600/300; 368/10; 700/241, 700/242
  See application file for complete search history.

(56) References Cited

U.S. PATENT DOCUMENTS

| | | | |
|---|---|---|---|
| 2,212,086 A | 8/1940 | Thornhill | |
| 2,251,234 A | 7/1941 | Swain | |
| 4,293,845 A | 10/1981 | Villa-Real | |
| 4,494,553 A | 1/1985 | Sciarra et al. | |
| 4,617,557 A | 10/1986 | Gordon | |
| 5,710,551 A * | 1/1998 | Ridgeway | ............... 340/870.09 |
| 5,827,180 A | 10/1998 | Goodman | |
| 5,850,937 A | 12/1998 | Rauche | |
| 6,169,707 B1 * | 1/2001 | Newland | ........................ 368/10 |
| 6,198,383 B1 | 3/2001 | Sekura et al. | |
| 6,259,654 B1 | 7/2001 | de la Huerga | |
| 6,529,446 B1 | 3/2003 | de la Huerga | |
| 6,560,165 B1 | 5/2003 | Barker | |
| 7,369,919 B2 * | 5/2008 | Vonk et al. | ..................... 700/236 |
| 8,193,918 B1 * | 6/2012 | Shavelsky et al. | ........ 340/309.16 |
| 8,214,077 B2 * | 7/2012 | Bertrand et al. | .............. 700/236 |
| 2002/0109706 A1 | 8/2002 | Lincke et al. | |
| 2003/0036683 A1* | 2/2003 | Kehr et al. | .................... 600/300 |
| 2005/0209999 A1 | 9/2005 | Jou | |
| 2007/0278285 A1 | 12/2007 | Ehrensvaerd | |
| 2008/0017722 A1 | 1/2008 | Snyder et al. | |
| 2008/0053222 A1 | 3/2008 | Ehrensvard et al. | |
| 2009/0199009 A1 | 8/2009 | Chia et al. | |
| 2009/0300723 A1 | 12/2009 | Nemoy et al. | |

FOREIGN PATENT DOCUMENTS

GB  2 344 194 A  5/2000

* cited by examiner

*Primary Examiner* — Joseph Burgess
(74) *Attorney, Agent, or Firm* — Law Offices of Robert F. Zielinski LLC

(57) ABSTRACT

A medication dispensing compliance device with interconnectivity to common vital sign monitoring devices such as blood pressure cuffs, glucometers, weight scales, pulse oximeters, heart rate monitors, body temperature, respirometers and other vital sign monitoring apparatus and a system for the aggregation of medication management and clinical vital signs to monitor patient compliance and efficacy of prescribed medications.

10 Claims, 4 Drawing Sheets

CONDITION STATE MONITOR AND MEDICATION MANAGER

CROSS-REFERENCE TO RELATED PATENT APPLICATIONS

The present patent application claims the benefit of U.S. Provisional Patent Application Ser. No. 61/305,433, filed Feb. 17, 2010, the entirety of which is hereby incorporated by reference.

FIELD OF THE INVENTION

This invention relates generally to medical monitoring devices, and more specifically medical condition monitoring devices and associated medication dispensing devices and apparatuses and compliance methods related thereto. The invention also relates to integrated remote monitoring devices and procedures for monitoring medical vital signs and medication compliance in patients and for methods of reporting monitored vital signs and medication compliance to a remote or centralized monitoring station.

BACKGROUND OF THE INVENTION AND PRIOR ART

Effective treatment of many common illnesses and medical conditions requires the administration of medications in a planned and controlled manner. Typically, a physician may prescribe a course of treatment for a patient. The patient is then responsible for taking the prescribed medication according to the instructions of the physician. Compliance with the prescribed medication at the proper times and dosages is often key to successful treatment and management of the associated illness or medical condition but all too often, patients either forget or elect not to follow the regimen prescribed. Research indicates that 40% of medications are not taken as prescribed. Moreover, many studies have shown that patients routinely simply fail to comply with the physician's directives and that compliance drops off precipitously when multiple medications or dosing schedules are prescribed.

For example, a physician may prescribe multiple medications aimed at treating different aspects of an illness or multiple medical conditions such as hypertension and hypercholesterolemia. As the number of medications prescribed increases, the responsibility on the part of the patient increases because of different dosages, intervals between dosages, and the like. Noncompliance is especially problematic when the medical condition being treated is chronic and extended therapeutic regimens are prescribed, often requiring therapeutic changes based on clinical symptoms. However, research has determined that neither the severity of the illness being treated nor the potentially life-threatening consequences related to the patient's failure to follow the course of treatment prescribed by the treating physician significantly improve compliance.

Another problem that has been experienced by prescription drug users is the overall safety of a patient's medications, including interactions between medications and/or special requirements that must be met when taking medications. For example, a physician may indicate that the prescribed medications must be taken in a certain order in order to maximize their efficiency with respect to treating specific medical conditions. In other cases, additional medical specialists may recommend that selected medications be taken with food or water. Further still, other medications may be prescribed to be taken in the absence of alcohol, other intoxicants or medications and even certain foods, such as grapefruit. All of the directions and warnings must be observed by the patient so that the course of treatment will be safe and effective.

Research has also shown that prescription drug users often do not fully understand the impact of failing to comply with the instructions provided by the physician and/or the pharmacist. Many patients either forget to take a specific medication at all or otherwise simply fail to observe the warnings described above.

Several factors appear to affect a patient's compliance with a prescribed course of treatment. These factors include (1) the accessibility of the medication at the prescribed time, (2) the forgetfulness of the patient, typically associated with age or temporarily induced by the type of medications such as opioid pain treatment medicines, (3) the accountability of the patient to a person who is aware of the treatment prescribed and who may monitor the compliance of the patient, (4) the complexity and frequency of medication dosages and (5) prolonged use of the prescribed medication. Other factors such as changes in physical environment of the patient, the ease by which certain medications can be retrieved from their dispensers and/or the diminution of symptoms produced by the effectiveness of the medication may also affect patient compliance.

Patient's noncompliance with a prescribed regimen can lead to several problems. Most obviously, the desired effect of treatment may not be obtained. Secondly, when missing a dose, a patient may attempt to rectify the situation by taking an additional dose. However, a dose taken at the incorrect time and interval could have severe consequences for some drugs. In addition, irregular drug administration could lead to drug resistance, particularly in the case of treating bacterial infections with antibiotics. In addition, a physicians may make changes in medications based on a persons symptoms which are a result of non compliance.

Patients all too often rely on memory and/or on manually operated medication dispensers to manage their treatment and their compliance with the instructions provided by the physician. For example, patients may rely on daily dosage pillboxes or similar devices to remind them to take their medication on a daily basis. However, these devices do not generally include any means for determining proper dosage intervals, especially for medications that must be taken more than once a day. Most of these devices do not provide any means for alerting a patient to the proper time and/or day for taking the prescribed medication, nor do these devices provide any means for reporting patient compliance to a medical professional or other trusted party. Moreover, none of these devices provide a mechanism for simultaneously remotely monitoring vital signs such as blood pressure, weight, and pulse for the particular medical condition being treated. For example, if the blood pressure is higher than desired and the patient is not taking their medications as prescribed, the physician can reiterate the need to be compliant with the medication instructions before making any changes in medication or other therapeutic suggestions.

Several efforts have been made to produce a device or method to help improve patient compliance with treatment regimens. For example, U.S. Pat. No. 6,529,446 and U.S. Pat. No. 6,259,654 to de la Huerga discloses a medication organizer with multiple vials secured to a unitary lid. Prescription and medication information is stored in a memory chip attached to the vial, which can be detected by the sensors in the unitary lid. The microprocessor determines the time of medication and reminds the patient with audible and visual alerts and a display, and the compliance information can be stored and communicated remotely. The device requires preparation of separate vials with individual memory chips each time a drug is dispensed by a pharmacist.

U.S. Pat. No. 6,560,165 to Barker discloses a medical information appliance in the form of a wrist watch which reminds a user of times to take medications or to perform medical-related activities. It features a delay mode, which shuts the alarm off but later reminds the user to take the indicated medication. Multiple alarms can be set for a variety of medications or other medical events, and multiple delay modes will be activated, so that the user is reminded to take medications which have been indicated by an alarm, but taking the medication was not confirmed by the user. The device also features a readout button for displaying stored medical information, for use by medical technicians in the field without connection to further equipment.

U.S. Pat. No. 4,293,845 to Villa-Real discloses a pocket-size electronic multi-patient medication-time-intake programmer and alarm system for use in homes, offices, clinics and hospitals in order to properly program a plurality of patients taking a singular or a plurality of medications, respectively, based on the desired time interval or frequency in hours as well as the duration in days. The device includes a memory in which all the program data during the certain time frame becomes stored and utilized to trigger the alarm system of the device to give the patient or the individual taking care of the patient or patients, the correct indication of the patient identification and the medicine identity to be taken at the particular instant when the alarm sounds. The device is also capable of registering the actual time and actual date of the dispensed medication.

U.S. Pat. No. 5,710,551 to Ridgeway, discloses a system for the remote monitoring of in-home self-medication to assure compliance with prescribed dosage schedules. The system comprises at least one patient home medication station which interfaces with a communications link and a remote central monitoring station also interfaced with the link and operative to receive and analyze messages transmitted by the home medication station. A central station computer means verify receipt of such signals within each subscriber's uniquely scheduled dosage time windows, and alerts an operator to take appropriate action if a dosage schedule error is detected. Since the central station will be alerted if any scheduled dosage is missed, no emergency rendering a patient unable to press a help-button or call for help can go undetected longer than the maximum time between consecutively scheduled dosages.

Canadian Patent Application No. 2,251,234 to Girgis discloses a portable medication reminder and compliance device. The disclosed device contains several medication compartments with a single LCD display providing medication information and messages, and alerting patients at medication times. The compliance data can be stored and communicated remotely. However, the medication compartments either contain no lid or just a simple cover with no control mechanism. Furthermore, the alert signals must be manually silenced in order to be recorded as an event of compliance.

U.S. Pat. No. 5,850,937 to Rauche discloses a pill dispenser with means to alert users of the time of medication, and the medication compartments are organized by each day of week or each day of month. The device requires input of a personal identification number or PIN for each user at each medication time, and the access of pills requires matching of correct PIN at each of the medication time.

Canadian Patent Application No. 2,212,086 to Ho et al. discloses a medication storage device with the compartments organized in each day of month, and a separate reminder unit providing visual and vibration alerts.

A pill organizer as disclosed in UK Patent No. GB 2,344194 to Doughty discloses medication compartments organized by multiple periods in a day for 8 days. In one embodiment, the compartments are sealed by film and the puncture of film is recorded as an event of medication compliance.

U.S. Pat. No. 4,617,557 to R. E. Gordon discloses a device specially designed for use with a blister package, having alert mechanism. The display is significantly abbreviated due to a limited display area. It reminds the user of the medication time by displaying time to next dose. The blister package needs to be specially prepared for each medication, and a patient may require multiple sets for multiple medications.

U.S. Pat. No. 6,198,383 issued on Mar. 6, 2001 to Sekura et al. discloses a small medication compliance device for single or multiple medications. The device reminds a user of the time to take medication, and it contains an event switch activated by a user after taking medication. The device is small enough to be attached to medication compartments which are physically separate, and the device further includes a remote programming feature via a wireless link.

It will be appreciated that medication compliance is critical to ensure that patients receive the maximum benefit of a prescribed course of treatment by their physician. In addition, no easy solution exists to combine taking a medication with a patient's body's response (i.e. vital signs) to the medication so that physicians and patients know whether or how the medication is/is not working. Lastly, as patients are more frequently taking a number of medications each with different frequencies and durations, it will be appreciated that a medication reminder system that is more sophisticated than a simple reminder is needed.

Despite previous efforts in the area of medical compliance devices, many of the devices heretofore reported are either cumbersome (e.g., the devices are not portable), expensive, lack desired functionality, or require complicated procedures for programming. Moreover, many prior devices and methods are complicated and difficult to use, especially for patients having compromised physical and/or cognitive abilities.

Currently the two tasks of managing medications and managing chronic conditions have been addressed in individual devices targeted to single components, typically, simply reminding a person to take a medication, such as measuring a vital sign and then reporting the results of both through independent communication to separate servers—vital signs or reports of taking medications. Some devices are PC based, some are mobile phone based, and many others require manual data entry, etc.

Currently no known medication dispensing device bridges the gap on mutually managing vitals and compliance in an easy to use consumer interface.

There is, therefore, a need for a simple but effective device that will assist a patient in managing their intake of prescription or over-the-counter medications and compliance with prescribed regimens. There is also a need for a mechanism to easily integrate remote monitoring devices and procedures for monitoring medical vital sign data and medication compliance in patients and for methods of reporting monitored vital sign data and compliance to a remote or centralized monitoring station where the information can be reported in real-time and/or stored for later retrieval.

SUMMARY OF THE INVENTION

The present invention is a medication dispensing compliance device with interconnectivity to common vital sign monitoring devices such as blood pressure cuffs, glucometers, weight scales, pulse oximeters and other similar monitoring apparatus. The present invention also provides a system for the aggregation of medication management and clinical vital signs as a way of not only monitoring patient compliance but also how effective the medications are in the overall patient medical condition management. This information not only allows patients to better understand if they are managing their conditions more actively—it more importantly allows physicians the opportunity to clearly determine if compliance with medication regimens are helping the patients they serve.

In one embodiment the medication dispensing compliance device (MDCD) takes the form of a "smart pill box" that can remind individuals when to take their prescribed medications. The device includes a microchip that time and date stamps the patients "interaction" (i.e. "compliance data" or CD) when the medication is to be taken. The compliance data is recorded locally and for transmitted to a local or remote database. In addition, the MDCD can also receive vital sign data information ("vital sign data" or VSD) from various "over-the-counter" or specialized monitoring devices including, but not limited to, non-invasive and invasive bio-sensing apparatuses such as blood pressure cuffs, pulse oximeters, weight scales, pedometers, heart rate monitors, blood glucose monitors, etc. (collectively "vital sign data sensors" or VSDS) via Bluetooth, NFC, wi-fi, and/or other wireless and/or wired connections such as usb, firewire, serial or parallel interfaces directly into the MDCD. The CD and VSD combination from the MDCD creates a comprehensive, real-time data log of the patient's condition currently as well as over time and a record of their overall health and physical state in response to the medication.

In other embodiments the device may be adapted to simultaneously receive information from multiple VSDS sources. In yet other embodiments, multiple MDCDs may be networked or otherwise combined such that multiple patient CD and VSD can be monitored for real time or later date analysis.

REFERENCE NUMBERS USED IN DRAWINGS 1 condition state monitor and medication management system;
2 is a representative patient;
3 is an event signal receiving device
5 patient side condition state monitor and medication management system;
10 medication dispensing compliance device (MDCD);
11 event trigger pathway;
12 event trigger response pathway;
13 gateway signal;
14 vital sign signal pathway;
15 medication compliance device signal pathway;
20 vital sign data sensor;
21 vital sign data interface;
22 bio-sensor;
25 vital sign data pathway;
30 local remote gateway;
35 MDCD/VSDS data pathway;
40 communications network;
45 MDCD/VSDS data server pathway;
47 MDCD/VSDS redundancy data pathway;
50 MDCD/VSDS data server;
55 remote station data pathway;
60 monitor data pathway;
80 monitoring station;
90 monitoring operation configuration;
100 MDCD base charging and sorting station;
102 MDCD smart pill box;
104 MDCD smart pill box dispensing aperture;
106 MDCD smart pill box medication cartridge;
108 MDCD smart pill box medication compartments;
110 MDCD smart pill box remote charging station.

DETAILED DESCRIPTION OF THE INVENTION

Figure 1:
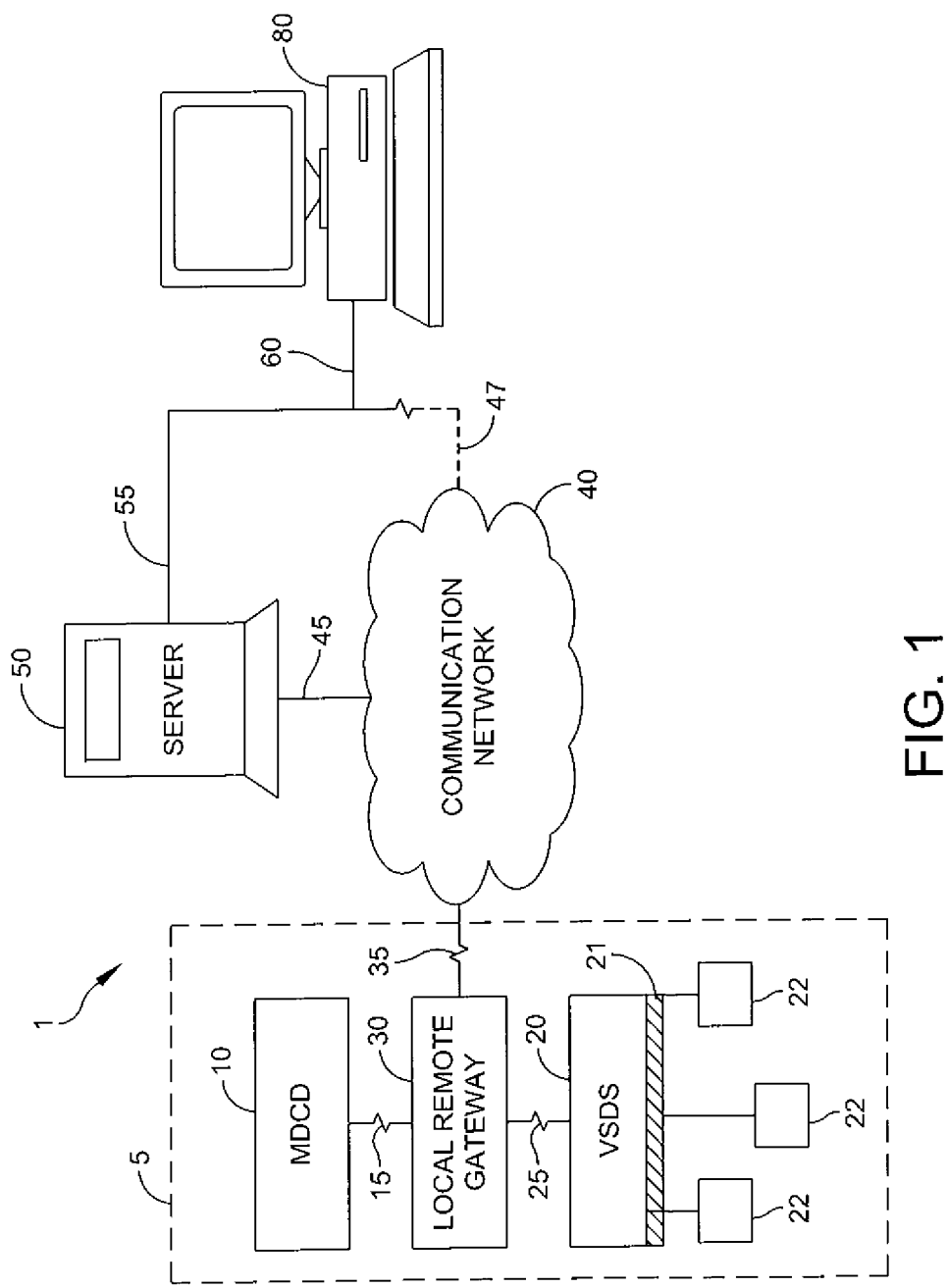
FIG. 1 is a functional system overview of a medical condition monitoring device and associated medication dispensing device of the present invention.
Figure 2:
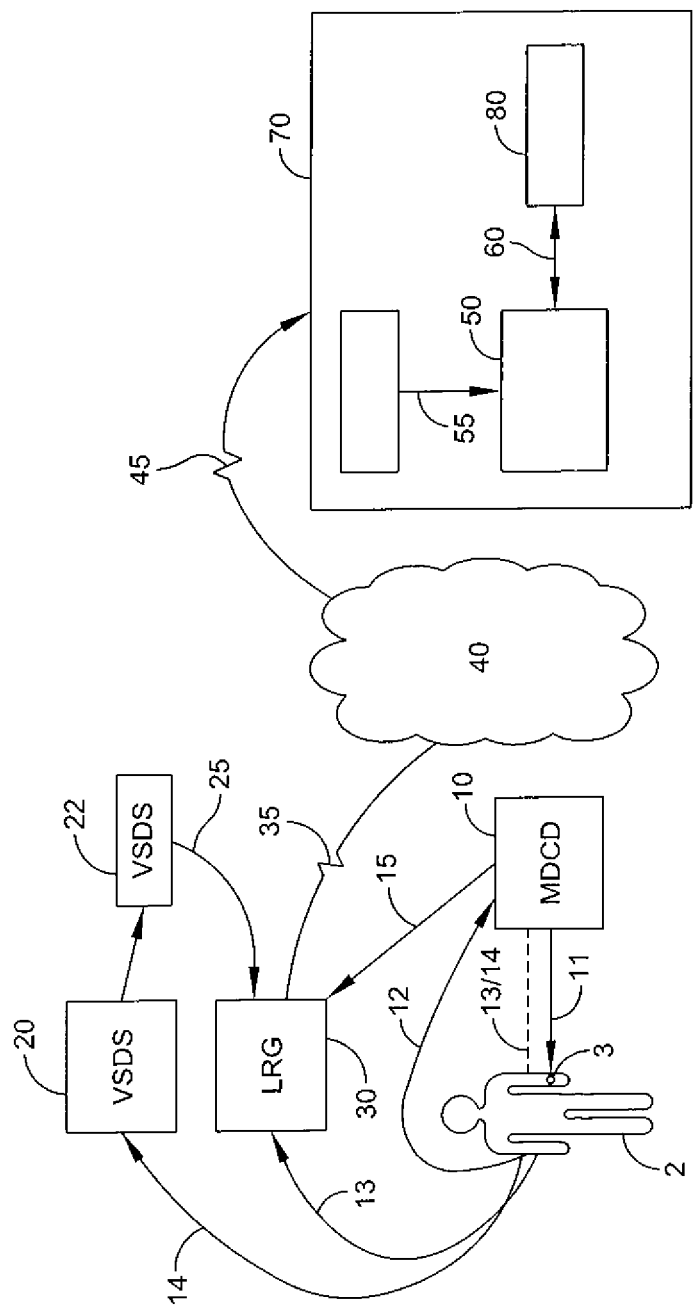
FIG. 2 is a functional system overview of one embodiment of the invention showing the communications links interface between a typical MDCD, a representative VSDS and a central monitoring station.

With reference to FIGS. 1 and 2, there is shown a generally the medication dispensing device and remote vital sign monitoring device and procedures for monitoring medical vital signs and medication compliance in patients to a remote or centralized monitoring station.

In FIG. 1, condition state monitor and medication management system 1 is generally comprised of patient side condition state monitor and medication management system 5, connected to communication network 40 which is in communication with MDCD/VSDS data server 50 and/or directly to monitoring station 80. Patient side condition state monitor and medication management system 5 includes medication dispensing compliance device (MDCD) 10, local remote gateway 30 and vital sign data sensor (VSDS) 20. Medication dispensing compliance device 10 is connected via medication compliance device signal pathway 15 to local remote gateway 30 which is in turn connected to vital sign data sensor 20 through vital sign data pathway 25.

As shown in FIG. 1, vital sign data sensor 20 further includes vital sign data interface 21 connected to at least one biosensor 23. In operation, medication dispensing compliance device 10 may include one or more compartments for containing a medication therein and may be programmed to send a signal to local remote gateway 30 via medication compliance device signal pathway 15 upon the occurrence of a trigger event. A trigger event can be selected from any number of occurrences which would indicate patient compliance or non-compliance with a prescribed medication schedule such as when the medication dispensing compliance device is activated by opening of a medication compartment, when a medication is removed, when the medication compartment is closed and at predetermined time periods that match prescribed dosing regimens and combinations thereof. A switch or a series of switches may be associated with medication compartment covers and/or the compartments themselves. These switches may be electrical contact, mechanical, electro-mechanical or an electronic switch (and combinations thereof) that may be activated by the opening and closing of the compartment lid or by the addition and/or removal of a medication from a medication compartment. Medication dispensing compliance device 10 may also be programmed with an audible and/or visual signaling means to facilitate a proper medication scheduling such that in a daily dosage regimen containing one or more medications, a patient may be reminded of the proper time to take a given medication and then only the correct medication compartment or compartments will be accessible or otherwise operable a predetermined times.

In electronic communication with medication dispensing compliance device 10 is vital sign data sensor 20. Vital sign data sensor 20 receives patient information in the form of medical and/or vital sign data from biosensor 22. Typically vital sign data may include, by way of example, heart rate, blood pressure, weight, body temperature, respiration, urinary output, blood sugar, blood oxygen, neuro-muscular activity as well as other non-invasive and/or invasive vital sign information from a patient (including combinations thereof). Vital sign data sensor typically includes one or more biosensors 22 connected via vital sign data interface 21 to vital sign data sensor 20. It will be appreciated that biosensor 22 will be of a type and will be matched to monitor a specific vital sign that corresponds directly or indirectly with the medication prescribed and with the medical condition of the patient. It will also be appreciated that one or more different biosensor 22 may be employed with each corresponding to a targeted vital sign and an associated prescribed medication via medication dispensing compliance device 10.

Biosensors 22 may be connected operatively to local remote gateway 30 by any number of wired or wireless protocols including both non-encrypted and encrypted communication protocols. Examples of known wireless protocols would 802.11 family members and blue-tooth as well as other wireless and wi-fi protocols operating in both "ad hoc" mode which allows wireless devices to communicate in peer-to-peer mode with each other and "infrastructure" mode which allows wireless devices to communicate with a central node that in turn can communicate with wired nodes on a LAN. Similarly, medication dispensing compliance device 10 may also be similarly configured to communicate to local remote gateway 30 via wired or wireless protocols and/or it may be configured to communicate directly with vital sign data sensor 20, using local remote gateway 30 principally as a data aggregator and sending unit. Lastly, data from any of the medication dispensing compliance device 10, local remote gateway 30, vital sign data sensor 20 and biosensor 22 can be transmitted and received using cellular telephony protocol or SMS text messaging.

It will also be appreciated that one or more of the functions or features of the medication dispensing compliance device 10, vital sign data sensor 20 and local remote gateway 30 can be combined in a single unit such that there is a centralized patient side condition state monitor and medication management system, as generally shown with respect reference number 5 in FIG. 1.

Data from vital sign data sensor 20 is sent to local remote gateway 30 where it is preferably combined with data from medication dispensing compliance device 10 which may be in the form of regimen confirmation, delivery schedule, compartment opening and closure time and/or other information and is then transmitted via MDCD/VSDS data pathway 35 to communications network 40.

FIG. 2 shows an exemplary embodiment of the condition state monitor and medication management system of the present invention and one mechanism of it operation. In the embodiment shown medication dispensing compliance device 10 sends an alert via event trigger pathway 11 to patient 2. The alert can be any number of different audible, visual or vibratory signals (and combinations thereof) which are received by the patient either directly or through an associated event signal receiving device 3. As in the embodiment shown, event signal receiving device 3 can include specially adapted or off-the-shelf electronic communications means such as user-wearable alert pendants, watches, fobs, bracelets or other jewelry like accessory as well as alarm clocks, remote timers and the like that are capable of receiving and transmitting a signal for purposes of alerting patient 2 of an event trigger. Though not shown, it will also be appreciated that other devices such as pagers, cellular telephones and/or PDAs may also be employed to receive an event trigger signal as well as so-called smart home technology receiver devices that may for example, cause other home electronic or electrical devices such as lights or alarms to become activated thereby notifying patient 2. Similarly, patient 2 may be notified via television or computer monitor screen crawl or by automated phone messaging services.

In one embodiment, in response to the event trigger, patient 2 interacts with either the signaling device or the medication dispensing compliance device by, for example, removing a medication from one or more medication compartments thereby creating a signal on event trigger response pathway 12. Event trigger response pathway 12 provides positive confirmation that a patient has received the event trigger signal. Preferably simultaneously with the event trigger response, typically, time stamp signals, are sent via gateway signal 13 to local remote gateway 30, via vital sign signal pathway 14 to vital sign data sensor 20 and via medication dispensing compliance device signal pathway 15 from medication dispensing compliance device to local remote gateway 30. In response to the incoming signal on vital sign signal pathway 14, vital sign data sensor 20 probes biosensor 22 for current or stored data which may be sent via vital sign data pathway 25 to local remote gateway 30. It will be understood at least one associated biosensor 22 may be programmed to correlate with one or more medications prescribed to a patient.

Local remote gateway 30 may preferably include erasable or permanent data memory where MDCD/VSDS data may be stored indefinitely or cached until released via MDCD/VSDS data pathway 35 to communications network 40. MDCD/VSDS data may be then transmitted via MDCD/VSDS data server pathway 45 via remote station data pathway 55 to monitoring operation center 90, typically comprised of MDCD/VSDS data server 50, monitoring station 80 connected via monitor data pathway 60.

In addition to providing both real-time and historical data with respect to medication compliance and patient health as measured by vital sign data, the compliance data of the present invention can be coordinated with a variety of medical professionals including primary and secondary physicians and medical institutions for research purposes, for example, in late phase drug monitoring, the data can also be used to project prescription refill needs in pharmacies and other drug dispensing clearing houses. Additionally, in some applications pharmacies can be automatically notified when the number of medications goes below a particular level or when there may be newly reported adverse actions reported within a population receiving medication combinations previously unknown to be contraindicated.

Figure 3:
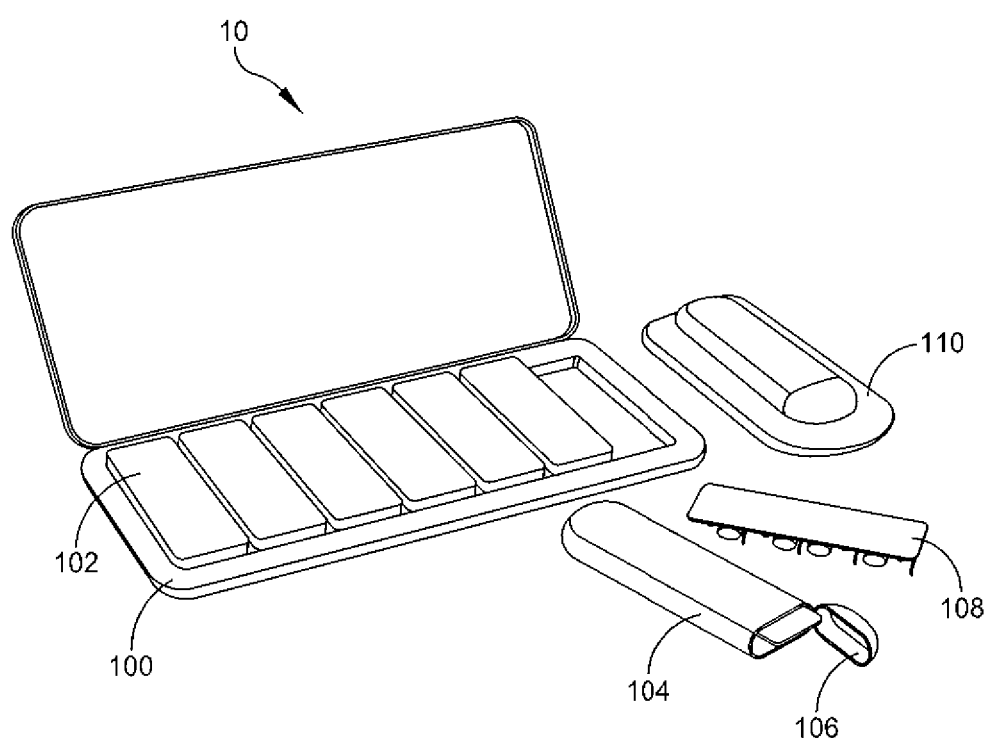
FIG. 3 is an perspective view of an embodiment of a representative MDCD of the present invention.

FIG. 3 shows one embodiment of the medication dispensing compliance device 10 of the present invention generally comprising MDCD base unit 100, MDCD smart pill box 102, MDCD smart pill box dispensing aperture 104, MDCD smart pill box cartridge 106 and MDCD smart pill box cartridge compartments 108.

In an embodiment MDCD base unit 100 may include a power unit for providing power to an integrated MDCD signaling means, vital sign data sensor and interface and to the local remote gateway for transmitting MDCD/VSDS data to a communications network, typically controlled by a special purpose CPU or CPUs which may be programmed to match a patient's medication(s) and dosage regimen(s) otherwise generally referred to patient medication data. Each MDCD smart pill box 102 may also preferably include dedicated CPUs which are synchronized with the MDCD base unit and patient medication data and which may be activated to enable the opening and/or sequence of opening of the MDCD smart pill box dispensing aperture(s) 104.

In one embodiment, each MDCD smart pill box 102 may correspond to a different day of the week and it will be appreciated that other configurations can be successfully employed using the present invention. Suitable configurations may include bi-weekly, monthly, quarterly, etc. or as may be prescribed by a physician or other medical professional. Additionally, each smart pill box 102 is portable and may be adapted to directly transmit and receive medication dispensing compliance data remotely while removed from the MDCD base unit 100 as well as providing such data for synchronization when it is returned to MDCD base unit 100. In alternative embodiments, each base station and smart pill box can communicate through a wireless hub, cell phone, or PC to download and upload data.

In use, MDCD smart pill box cartridge 106 and MDCD smart pill box cartridge compartments 108 are preferably pre-loaded with the proper medications by a patient, a patient's family member, a pharmacy or other allied medical professional. Upon receiving a signal associated with an event trigger, a patient will remove the medication(s) from MDCD smart pill box 102, held in MDCD smart pill box cartridge compartments 108 through MDCD smart pill box dispensing aperture 104. A time stamped signal is simultaneously generated and is stored locally or may be sent to MDCD base unit 100 the indicating that MDCD smart pill box dispensing aperture 104 was opened and that medication was removed from MDCD smart pill box cartridge compartment 108. In conjunction with the receipt of the trigger event signal, the VSDS is activated and an appropriate biosensor is probed for data vital sign data transmission. The MDCD data and VSDS data are paired and sent to a queue on the local remote gateway.

The integrated VSDS portion of MDCD base unit 100 may also have one or more USB and/or IEEE 1394 interface ports for connecting health related devices. The IEEE 1394 interface is a serial bus interface standard for high-speed communications and isochronous real-time data transfer. Additionally, data communication may be also accomplished via Bluetooth or ZigBee. ZigBee is a high level communication protocol using small, low-power digital transmitters based on the IEEE 802.15.4-2003 standard for wireless personal area networks (WPANs), such as wireless headphones connecting with cell phones via short-range radio. ZigBee is particularly well suited to radio-frequency (RF) applications that require a low data rate, long battery life, and secure networking. In use the local remote gateway wirelessly collects data from smart pill box 102 on medication compliance as well as communicates changes in reminder system in each smart pill box.

MDCD smart pill box 102 may include up to five or more MDCD smart pill box medication compartments 108 which may be programmed for signal reminders (auditory, visual, vibratory or coupled to external devices) to alert a patient to take a prescribed medication as well as for opening and closure of a compartment. Preferably MDCD smart pill box dispensing aperture 104 providing access to medication compartments 108 are flexible and may have hinged or slide-type openings. Additionally, they may also have the ability to provide visual cues such as with LEDs or by color change as to the specific compartment from which medications should be removed. In some embodiments, for example, MDCD smart pill box dispensing aperture 104 may only open within a limited time window after the programmed time during which medication is to be taken.

Figure 4:
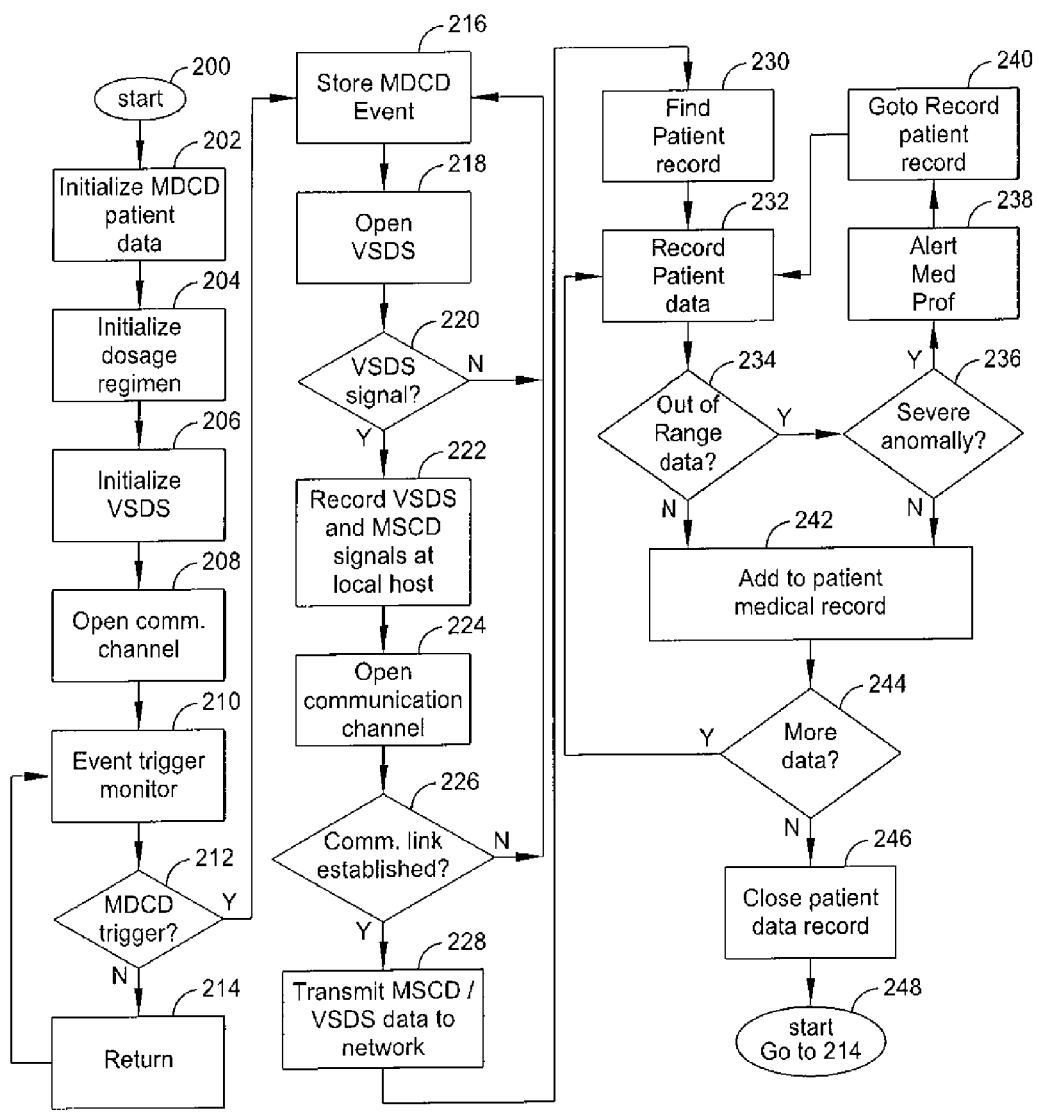
FIG. 4 is a simplified flow chart diagram of the operation of one embodiment of MDCD and associated VSDS of the present invention.

FIG. 4 is a flowchart of an exemplary embodiment of the operation of the present invention. Start 200 signifies the operation sequence of the condition state monitor and medication management system, for example, those shown in FIGS. 1 and 2. The initialization of the MDCD patient data takes place in step 202, followed by the initialization of the dosage regimen in step 204 and then the initialization of the VSDS in step 206. During these steps the condition state monitor and medication management system may initialize information concerning the patient, the medication(s) regimen(s) prescribed and VSDS, during which time the appropriate data connections and handshaking sequences are activated and passed on to the local remote gateway in step 208. With event trigger monitor in stand-by mode in step 210, the condition state monitor and medication management system remains idle as in steps 212 and 214 until such time that there is a MDCD event trigger, typically a preset alert notifying a patient to take a prescribed medication. The MCDC event is then stored as MDCD data in step 216 and a signal is passed to open the VSDS at step 218 to wait for a VSDS signal in step 220. If no VSDS signal is received the system then remains in stand-by loop mode returning to step 216.

When a VSDS signal is received it is synchronized with the MDCD data and the combined MDCD/VSDS data is stored temporarily at the local remote gateway at step 222 where the local remote gateway communication channel is probed for ready state at 224 awaiting a confirmed communication link with the communications network at 226. If no communication link is established, MDCD/VSDS data is recorded and stored in a registry at step 216 until such time that a communications link in step 226 is established.

Upon establishment of communications link 226, MDCD/VSDS data is transmitted via a communications network to a server or other dedicated data storage and processing center where the initial DCDC/VSDS data is matched with a patient record in step 230 and then recorded for initial assessment in 232. MDCD/VSDS data is evaluated for range acceptability in step 234. If there is an out of range flag, the MDCD/VSDS data is then further evaluated for severity in step 236. If the MDCD/VSDS data is out of range but within limits the MDCD/VSDS data will be added to the patient medical record at 242. Sufficiently out of range or severe anomalies will cause an alert message to be sent to a medical professional or other remote medical history file in step 238 and the alert message and MDCD/VSDS data is then sent via step 240 to be recorded in step 232 with the flag removed and the MDCD/VSDS data is then added to the patient medical record at 242.

It will be appreciated that in the embodiment described that MDCD/VSDS data may be added to the patient medical record in a serial or step by step fashion as exemplified by step 244. Where there is additional MDCD/VSDS data corresponding to other medication compliance and other vital sign data each subsequent entry will be evaluated and recorded as per steps 232 to 244 inclusive. If there is no more data in the MDCD/VSDS data transmission set, the patient record is closed at step 246 and the program ends at step 248 returns to step 214 awaiting the next event trigger.

From the foregoing detailed description and examples, it will be evident that modifications and variations can be made in the devices and methods of the invention without departing from the spirit or scope of the invention. Therefore, it is intended that all modifications and verifications not departing from the spirit of the invention come within the scope of the claims and their equivalents.

What we claim as our invention:

1. A vital sign monitoring system for monitoring compliance with prescribed medication dosage schedules via a communication link to a local remote station and a central monitoring station, comprising:
   a) a vital sign data sensor operative to generate predetermined signals corresponding to a patient's vital signs;
   b) a medication dispensing compliance device having a housing that defines a plurality of compartment openings, each compartment opening adapted to hold at least one medication, the housing further comprising signal means to facilitate proper medication scheduling such that, the signal means reminds a patient of a proper time to take the at least one medication according to the dosage schedule;
   c) a plurality of covers, each cover having a closed state and an open state for selectively closing one of the compartment openings to restrain access to the contents of that compartment, wherein the cover provides access to the content of the respective compartment when opened, and wherein each opening and cover defines a pillbox, each pillbox being removable from the housing, each pillbox having a dedicated processor operative to match the patient's at least one medication according to the dosage schedule stored in a local remote station when the pillbox is removed from the housing and operative to synchronize the pillbox data pertaining to the patient's at least one medication according to the dosage schedule with the local remote station when the pillbox is returned to the housing;
   d) at least one latch for operatively locking, opening and closing the covers, wherein the at least one latch is in operative communication with the housing signal means and wherein the medication compartment or compartments are only accessible or otherwise operable at predetermined times corresponding to the dosage schedule;
   e) a monitor and signal generator switch that generates a signal corresponding to the open and closed state of each cover;
   f) the local remote station that stores, transmits, and receives vital sign data and medication dispensing compliance device information corresponding to the open and closed state of each cover via the communication link,
   g) a central monitoring station that stores, receives, and transmits via the communication link, and that processes the information corresponding to medication removal activities and vital sign data to monitor patient compliance with prescribed medication dosage schedules and within patient parameters according to the dosing schedule,
      wherein the local remote station further comprises a communicator that is activated by the generated predetermined signals to responsively transmit corresponding to the medication removal activity and vital sign data messages to the central monitoring station via the communications link; and
   wherein the central monitoring station further comprising:
      i. a first processor operative at the central monitoring station to schedule daily medication dosage time windows of the same or varying time width for the patient, one of the dosage time windows is for the patient's prescribed daily dosages according to the dosage schedule, each time window bounded by a unique opening time and a unique closing time specified by or for the patient, wherein the patient compliance with prescribed medication dosage schedules and vital sign data is alarm monitored when medication activity or vital sign data is outside of patient parameters or that notifies a third party of an alarm event, patient non-compliance or medication refill status; and
      ii. a second processor operative at the central monitoring station to alarm monitor medication activity messages and vital sign data to assess compliance with the patient's prescribed medication dosage schedules and vital sign data is within patient parameters, and
   wherein the signal means comprises each cover being adapted to change colors, providing a visual cue that the respective cover may be opened by the patient and further wherein the compliance data and the vital sign data combination from the medication dispensing compliance device creates a real time data log of the patient's current condition as well as local and remote records of the patient's overall health and physical state in response to at least one administered medication and further comprises notifying a third party of an alarm event, patient non-compliance or medication refill status.

2. The vital sign monitoring system of claim 1 wherein the vital sign sensor data is selected from the group comprising blood pressure, blood sugar, body weight, dissolved blood oxygen, body temperature, respiration, heart rate, wakefulness, body position and body movement.

3. The vital sign monitoring system of claim 1, the latch comprises a plurality of latches, each latch being controlled by the dedicated processor of each pillbox to operatively lock, open and close the respective cover, wherein the respective medication compartment is controlled by the dedicated processor is only accessible or otherwise operable at predetermined times corresponding to the dosage schedule.

4. The vital sign monitoring system of claim 2, the latch comprises a plurality of latches, each latch being controlled by the dedicated processor of each pillbox to operatively lock, open and close the respective cover, wherein the respective medication compartment is controlled by the dedicated processor is only accessible or otherwise operable at predetermined times corresponding to the dosage schedule.

5. The vital sign monitoring system of claim 1, wherein the dedicated process or of each pillbox is operative to schedule daily medication dosage time windows of the same or varying time width for the patient, one of the dosage time windows is for the patient's prescribed daily dosages according to the dosage schedule, each time window bounded by a unique opening time and a unique closing time specified by or for the patient, wherein the patient compliance with prescribed medication dosage schedules and vital sign data is alarm monitored when medication activity or vital sign data is outside of patient parameters or that notifies a third party of an alarm event, patient non-compliance or medication refill status.

6. The vital sign monitoring system of claim 2, wherein the dedicated process or of each pillbox is operative to schedule daily medication dosage time windows of the same or varying time width for the patient, one of the dosage time windows is for the patient's prescribed daily dosages according to the dosage schedule, each time window bounded by a unique opening time and a unique closing time specified by or for the patient, wherein the patient compliance with prescribed medication dosage schedules and vital sign data is alarm monitored when medication activity or vital sign data is outside of patient parameters or that notifies a third party of an alarm event, patient non-compliance or medication refill status.

7. The vital sign monitoring system of claim 3, wherein the dedicated process or of each pillbox is operative to schedule daily medication dosage time windows of the same or varying time width for the patient, one of the dosage time windows is for the patient's prescribed daily dosages according to the dosage schedule, each time window bounded by a unique opening time and a unique closing time specified by or for the patient, wherein the patient compliance with prescribed medication dosage schedules and vital sign data is alarm monitored when medication activity or vital sign data is outside of patient parameters or that notifies a third party of an alarm event, patient non-compliance or medication refill status.

8. The vital sign monitoring system of claim 2 wherein the signal means comprises each cover being adapted to change colors, providing a visual cue that the respective cover may be opened by the patient.

9. The vital sign monitoring system of claim 3 wherein the signal means comprises each cover being adapted to change colors, providing a visual cue that the respective cover may be opened by the patient.

10. The vital sign monitoring system of claim 7 wherein the signal means comprises each cover being adapted to change colors, providing a visual cue that the respective cover may be opened by the patient.

* * * * *